US009775076B2

(12) United States Patent
Chen et al.

(10) Patent No.: US 9,775,076 B2
(45) Date of Patent: Sep. 26, 2017

(54) METHOD AND RELATED APPARATUS FOR RESETTING HIGH SPEED MEDIUM ACCESS CONTROL ENTITY

(71) Applicant: HUAWEI TECHNOLOGIES CO., LTD., Shenzhen, Guangdong (CN)

(72) Inventors: Jun Chen, Shanghai (CN); Yi Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/513,520

(22) Filed: Oct. 14, 2014

(65) Prior Publication Data

US 2015/0031364 A1    Jan. 29, 2015

Related U.S. Application Data

(63) Continuation of application No. PCT/CN2013/077238, filed on Jun. 14, 2013.

(30) Foreign Application Priority Data

Sep. 29, 2012  (WO) ................ PCT/CN2012/082463

(51) Int. Cl.
*H04W 36/00* (2009.01)
*H04W 36/02* (2009.01)

(52) U.S. Cl.
CPC ..... *H04W 36/0027* (2013.01); *H04W 36/023* (2013.01)

(58) Field of Classification Search
CPC ................................................ H04W 36/0055

USPC ......................................................... 455/436
See application file for complete search history.

(56) References Cited

U.S. PATENT DOCUMENTS

| 2003/0016698 | A1  | 1/2003 | Chang et al. |
| 2008/0188220 | A1  | 8/2008 | DiGirolamo et al. |
| 2008/0188224 | A1* | 8/2008 | Pani ................ H04W 36/0005 455/436 |
| 2009/0168728 | A1  | 7/2009 | Pani et al. |
| 2009/0169200 | A1  | 7/2009 | Li et al. |
| 2010/0238830 | A1* | 9/2010 | Kim .................... H04W 52/365 370/252 |
| 2012/0127959 | A1* | 5/2012 | Digirolamo ....... H04W 36/0055 370/331 |

(Continued)

FOREIGN PATENT DOCUMENTS

| CN | 1406008 A | 3/2003 |
| CN | 1697545 A | 11/2005 |

(Continued)

OTHER PUBLICATIONS

International Search Report dated Sep. 5, 2013, in corresponding International Patent Application No. PCT/CN2013/077238.

(Continued)

*Primary Examiner* — Fabricio R Murillo Garcia
(74) *Attorney, Agent, or Firm* — Staas & Halsey LLP

(57) ABSTRACT

A method for resetting a high speed medium access control entity includes: receiving a reset instruction sent from a radio network controller, where the reset instruction includes reset indication information of a cell; and determining a to-be-reset cell according to the reset indication information, and resetting a high speed medium access control entity for the to-be-reset cell.

20 Claims, 10 Drawing Sheets

(56) References Cited

U.S. PATENT DOCUMENTS

| | | | | |
|---|---|---|---|---|
| 2012/0163338 A1* | 6/2012 | Zhang | ............... | H04W 36/0083 370/331 |
| 2012/0281544 A1* | 11/2012 | Anepu | ................ | H04B 7/0632 370/241 |
| 2013/0114418 A1* | 5/2013 | Kubota | ................ | H04W 24/10 370/248 |
| 2013/0163564 A1 | 6/2013 | Pani et al. | | |
| 2014/0044102 A1 | 2/2014 | Pani et al. | | |
| 2014/0112218 A1 | 4/2014 | Li | | |
| 2014/0112219 A1 | 4/2014 | Li et al. | | |

FOREIGN PATENT DOCUMENTS

| | | |
|---|---|---|
| CN | 1852076 A | 10/2006 |
| CN | 1852243 A | 10/2006 |
| CN | 1852571 A | 10/2006 |
| CN | 1859037 A | 11/2006 |
| CN | 1859716 A | 11/2006 |
| CN | 1968141 A | 5/2007 |
| CN | 1984453 A | 6/2007 |
| CN | 101005691 A | 7/2007 |
| CN | 101034965 A | 9/2007 |
| CN | 101060476 A | 10/2007 |
| CN | 101277176 A | 10/2008 |
| CN | 101335693 A | 12/2008 |
| CN | 101425957 A | 5/2009 |
| CN | 101594214 A | 12/2009 |
| CN | 101933362 A | 12/2010 |
| CN | 102045727 A | 5/2011 |
| CN | 102083154 A | 6/2011 |
| CN | 102083213 A | 6/2011 |
| CN | 102378225 A | 3/2012 |
| CN | 102625383 A | 8/2012 |
| CN | 102820960 A | 12/2012 |
| CN | 103096494 A | 5/2013 |
| CN | 103117840 A | 5/2013 |
| CN | 103313378 A | 9/2013 |
| CN | 103326760 A | 9/2013 |
| EP | 1465369 | 3/2003 |
| RU | 2009 132 930 A | 3/2011 |
| RU | 2 457 636 C2 | 4/2012 |
| WO | WO2009097481 | 8/2009 |
| WO | WO 2012/044694 A1 | 4/2012 |
| WO | WO2012088440 | 6/2012 |

OTHER PUBLICATIONS

Extended European Search Report, dated Mar. 9, 2015, in corresponding European Application No. 13841680.5 (10 pp.).

European Office Action dated Feb. 10, 2016 in corresponding European Patent Application No. 13841680.5.

"Change Request", R2-124187, 3GPP TSG-RAN2 Meeting #79, Aug. 13-17, 2012, Qingdao, China, pp. 1-5.

Russian Office Action dated Nov. 9, 2014 in corresponding Russian Patent Application No. 2015116289/07.

PCT International Search Report dated Sep. 29, 2012 in corresponding International Patent Application No. PCT/CN2012/082463.

PCT International Search Report dated Jun. 14, 2013 in corresponding International Patent Application No. PCT/CN2013/077238.

Nokia Siemens Networks, "Introduction of Multiflow in TS 25.331", Change Request, 25.331 CR 5071 rev 1, Current version: 11.2.0, 3GPP TSG-RAN2 Meeting #79, Qingdao, China, Aug. 13-17, 2012, 54 Pages.

"3rd Generation Partnership Project; Technical Specification Group Radio Access Network; Radio Resource Control (RRC); Protocol specification (Release 11)", 3GPP TS 25.331, vol. 11.3.0, Sep. 2012, pp. 1-1981.

* cited by examiner

METHOD AND RELATED APPARATUS FOR RESETTING HIGH SPEED MEDIUM ACCESS CONTROL ENTITY

CROSS-REFERENCE TO RELATED APPLICATIONS

This application is a continuation of International Application No. PCT/CN2013/077238, filed on Jun. 14, 2013, which claims priority to International Application No. PCT/CN2012/082463, filed on Sep. 29, 2012, both of which are hereby incorporated by reference in their entireties.

TECHNICAL FIELD

The present invention relates to a field of wireless communications, and in particular, to a method and a related apparatus for resetting a high speed medium access control entity.

BACKGROUND

A feature, i.e. high speed data packet access (HSDPA), is introduced in the universal mobile telecommunications system (UMTS) Release 5 (Rel-5), so as to further improve a user equipment (UE) peak throughput and cell throughput. After the HSDPA is configured on a UE, one and only one high speed downlink shared channel (HS-DSCH) serving cell is configured to the UE, and all HSDPA physical channels of the UE are established only on the HS-DSCH serving cell, in this case, on the UE side, there is a high speed medium access control (MAC-hs) entity or an enhanced high speed medium access control (MAC-ehs) entity, used to perform receive data at a MAC layer, correspondingly, on a network side, a MAC-hs or MAC-ehs entity is also configured in the HS-DSCH serving cell to perform send HS-DSCH data at the MAC layer.

A feature, i.e. multiflow transmission (Multiflow), is introduced when the UMTS technologies evolve to Rel-11. This feature allows a configuration that a UE sends HS-DSCH data in multiple intra-frequency cells or multiple inter-frequency cells, which can improve experience of a cell edge user significantly. At best a maximum of Multiflow cells, i.e. four Multiflow cells, namely, Cell-1, Cell-2, Cell-3, and Cell-4, can be concurrently configured for a user at the same time, where the Cell-1 and the Cell-2 are at a frequency 1, and the Cell-3 and the Cell-4 are at a frequency 2. Among the Multiflow cells, one Multiflow cell is called an HS-DSCH serving cell or an HS-DSCH primary cell of the UE, another cell which has the intra-frequency with the HS-DSCH serving cell is called an HS assisting serving cell or assisting serving cell of the UE, another cell that has a same timing relationship as the HS-DSCH serving cell is called an HS secondary serving cell or a secondary serving cell of the UE, and another cell which has the intra-frequency with the HS secondary serving cell is called an HS assisting secondary serving cell or assisting secondary serving cell of the UE.

Processing of the MAC-hs/MAC-ehs in a process of an HS-DSCH serving cell handover is as follows.

In the protocol, both the MAC-hs and the MAC-ehs are used to process data transmitted on an HS-DSCH, and configuration information of the MAC-hs and the MAC-ehs is controlled by an RRC layer. On the network side, each cell has one MAC-hs/MAC-ehs entity. Main functions of the MAC-hs or the MAC-ehs include: flow control, scheduling/priority processing, a hybrid automatic repeat request (HARQ) function, and TFRC selection; the MAC-ehs entity is an enhanced entity as the MAC-hs entity, and an added function of the MAC-ehs entity is mainly segmentation of a MAC-ehs SDU. When the HSDPA is introduced in Rel-5, on the UE side, it specifies that only one MAC-ehs entity exists on the UE side and corresponds to the HS-DSCH serving cell.

In the prior art, movement of a UE may trigger a handover of an HS-DSCH serving cell of the UE, and possibly, along with MAC-hs/MAC-ehs reset. In Multiflow, multiple Multiflow cells may be under a same NodeB or different NodeBs, when the multiple Multiflow cells are under different NodeBs, two MAC-ehses are required on the UE side to separately process downlink data sent from each NodeB. A single frequency dual cell (SF-DC) mode in Multiflow is used as an example, because MAC-ehses corresponding to an SF-DC primary cell and an SF-DC assisting cell of the UE may change, the network side may initiate a MAC-ehs reset process according to a procedure in an existing protocol, and a radio network controller (RNC) may only instruct the UE to clear data buffered on the MAC-ehs corresponding to the primary cell and set the MAC-ehs to an initial status; while for processing of the MAC-ehs corresponding to the assisting cell, there is no specification or indication that the UE needs to clear data buffered on both MAC-ehses and concurrently set both MAC-ehses to initial statuses.

The MAC-hs/MAC-ehs reset action in the prior art may cause two problems: One is that the UE does not know how to process the MAC-ehs corresponding to the assisting cell after the handover, thereby leading to an abnormal behavior of the UE; and another is that, after the handover, the UE must clear the data buffered on both MAC-ehses and set the both MAC-ehses to initial statuses, because during the MAC-hs/MAC-ehs reset, all buffered data of the MAC-layer are lost, a retransmission at a higher level (for example, retransmission at a radio link control layer) must be triggered, and in this way, system performance may be affected (which is specifically manifested in a data service interruption, a call drop resulting from loss of downlink air-interface signaling, or the like). As a result, the reset action of the MAC-hs/MAC-ehs in the prior art affects user experience, such as unsmooth video playing and a sudden call drop during a call.

SUMMARY

Embodiments of the present invention provide a method and a related apparatus for resetting a high speed medium access control entity, so as to avoid an abnormal behavior of a user equipment and avoid unnecessary reset of a high speed medium access control entity.

A method for resetting a high speed medium access control entity provided by a first aspect of the present invention includes:

receiving a reset instruction sent from a radio network controller, where the reset instruction includes reset indication information of a cell; and determining a to-be-reset cell according to the reset indication information, and resetting a high speed medium access control entity for the to-be-reset cell.

In a first possible implementation manner of the first aspect, before the receiving a reset instruction sent from a radio network controller, the method includes:

reporting, by a user equipment, a medium access control (MAC) capability identifier to the radio network controller, where the MAC capability identifier is configured to identify whether the user equipment has a capability of resetting at least one high speed medium access control entity.

With reference to the first aspect or the first possible implementation manner of the first aspect, in a second possible implementation manner, the reset indication information of the cell includes: a reset indicator bit in cell configuration information, or an identifier of the to-be-reset cell, or an identifier of a not-to-be-reset cell.

With reference to the first aspect or any one of the first to the second possible implementation manners of the first aspect, in a third possible implementation manner, the reset instruction is transmitted by radio resource control (RRC) signaling.

With reference to the first possible implementation manner of the first aspect, in a fourth possible implementation manner, the MAC capability identifier is transmitted by RRC signaling.

A method for resetting a high speed medium access control entity provided by a second aspect of the present invention includes:

determining a to-be-reset cell according to a predefined rule, where the to-be-reset cell is a cell for which a user equipment undergoing a cell handover needs to reset a high speed medium access control entity; and sending a reset instruction to the user equipment, so that the user equipment resets the high speed medium access control entity for the to-be-reset cell indicated in the reset instruction, where the reset instruction includes reset indication information of a cell.

In a first possible implementation manner of the second aspect, before the determining a to-be-reset cell according to a predefined rule, the method includes:

acquiring a MAC capability identifier, where the MAC capability identifier is configured to identify whether the user equipment has a capability of resetting at least one high speed medium access control entity.

With reference to the second aspect or the first possible implementation manner of the second aspect, in a second possible implementation manner, the determining a to-be-reset cell according to a predefined rule includes:

if one cell that participates in high speed downlink shared channel (HS-DSCH) data transmission after the cell handover is one of cells before the cell handover, and the user equipment is in a multiflow transmission status before or after the cell handover, determining that the cell is a not-to-be-reset cell; or if one cell that participates in HS-DSCH data transmission after the cell handover and any cell that participates in HS-DSCH data transmission before the cell handover belong to a same base station, and the user equipment is in a multiflow transmission status before or after the cell handover, determining that the cell is a not-to-be-reset cell; and determining that a cell among cells that participate in HS-DSCH data transmission after the cell handover except for the not-to-be-reset cell is the to-be-reset cell.

With reference to the second aspect or any one of the first to the second possible implementation manners of the second aspect, in a third possible implementation manner, the reset instruction is transmitted by radio resource control (RRC) signaling.

With reference to the second possible implementation manner of the second aspect, in a fourth possible implementation manner, the MAC capability identifier is transmitted by RRC signaling.

With reference to the second aspect or any one of the first to the fourth possible implementation manners of the second aspect, in a fifth possible implementation manner, the reset indication information of the cell includes: a reset indicator bit in cell configuration information, or an identifier of the to-be-reset cell, or an identifier of the not-to-be-reset cell.

A method for resetting a high speed medium access control entity provided in a third aspect of the present invention includes:

receiving, by a user equipment, a medium access control (MAC) control instruction sent from a radio network controller, where the MAC control instruction is configured to instruct the user equipment to determine a to-be-reset cell; and determining, by the user equipment, the to-be-reset cell according to a predefined rule, and resetting a high speed medium access control entity for the to-be-reset cell.

With reference to the third aspect, in a first possible implementation manner, the determining the to-be-reset cell according to a predefined rule includes:

if one cell that participates in high speed downlink shared channel (HS-DSCH) data transmission after a cell handover is one of cells before the cell handover, and the user equipment is in a multiflow transmission status before or after the cell handover, determining that the cell is a not-to-be-reset cell; or if one cell that participates in HS-DSCH data transmission after the cell handover and any cell that participates in HS-DSCH data transmission before the cell handover belong to a same base station, and the user equipment is in a multiflow transmission status before or after the cell handover, determining that the cell is a not-to-be-reset cell; and determining that a cell among cells that participate in HS-DSCH data transmission after the cell handover except for the not-to-be-reset cell is the to-be-reset cell.

With reference to the third aspect or the first possible implementation manner of the third aspect, in a second possible implementation manner, before the receiving a MAC control instruction sent from a radio network controller, the method includes:

reporting, by the user equipment, a medium access control (MAC) capability identifier to the radio network controller, where the MAC capability identifier is configured to identify whether the user equipment has a capability of resetting at least one high speed medium access control entity.

With reference to the third aspect or any one of the first to the second possible implementation manners of the third aspect, in a third possible implementation manner, the MAC control instruction is transmitted by RRC signaling.

With reference to any one of the first to the third possible implementation manner of the third aspect, in a fourth possible implementation manner, the MAC capability identifier is transmitted by RRC signaling.

A method for resetting a high speed medium access control entity provided by a fourth aspect of the present invention includes:

sending a medium access control (MAC) control instruction to a user equipment, where the MAC control instruction is configured to instruct the user equipment to determine a to-be-reset cell according to a predefined rule, and resetting a high speed medium access control entity for the to-be-reset cell.

With reference to the fourth aspect, in a first possible implementation manner, before the sending a MAC control instruction to a user equipment, the method includes:

acquiring a medium access control (MAC) capability identifier, where the MAC capability identifier is configured to identify whether the user equipment has a capability of resetting at least one high speed medium access control entity.

With reference to the fourth aspect or the first possible implementation manner of the fourth aspect, in a second possible implementation manner, the MAC control instruction is transmitted by RRC signaling.

With reference to the first possible implementation manner of the fourth aspect, in a third possible implementation manner, the MAC capability identifier is transmitted by RRC signaling.

When the user equipment performs the cell handover, the user equipment receives the reset instruction sent from the radio network controller, and determines the to-be-reset cell according to the reset indication information and resets the high speed medium access control entity for the to-be-reset cell, thereby making the user equipment know a next behavior or operation, avoiding an abnormal behavior of the user equipment, avoiding unnecessary reset of the high speed medium access control entity, and improving user experience.

DESCRIPTION OF EMBODIMENTS

Embodiments of the present invention provide a method and a related apparatus for resetting a high speed medium access control entity, so as to avoid an abnormal behavior of a user equipment and avoid unnecessary reset of a high speed medium access control entity.

In a practical application, movement of a user equipment triggers the user equipment to perform a cell handover, and after the cell handover, mapping information between the high speed medium access control entity and a cell may change. Therefore, the high speed medium access control entity needs to be reset.

Figure 1:
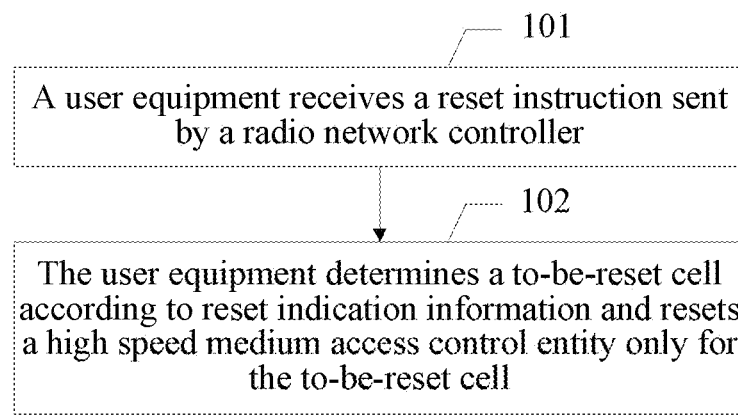
FIG. 1 is a schematic diagram of an embodiment of a method for resetting a high speed medium access control entity according to the present invention.

Referring to FIG. 1, FIG. 1 is a schematic flowchart of a method for resetting a high speed medium access control entity according to an embodiment of the present invention.

101. A User Equipment Receives a Reset Instruction Sent from a Radio Network Controller.

The user equipment receives the reset instruction sent from the radio network controller, where the reset instruction includes reset indication information of a cell, and the reset indication information of the cell is configured to indicate the cell (to-be-reset cell for short) that requires reset of a high speed medium access control entity.

When a cell handover (which may specifically be an HS-DSCH serving cell handover) occurs, a network-side device (for example, a base station or the radio network controller) may determine, according to information about cells before and after the cell handover, the cell that requires reset of the high speed medium access control entity, and the network-side device may use the reset indication information of the cell to indicate the to-be-reset cell in the reset instruction.

Further, the reset indication information of the cell may also indicate only that an assisting cell and/or an assisting secondary cell requires reset of the high speed medium access control entity, that is, the to-be-reset cell indicated by the reset indication information includes only the assisting cell and/or the assisting secondary cell.

Further, if the user equipment does not receive the reset instruction sent from the radio network controller, the user equipment determines, according to a behavior specified in the prior art, the cell that requires reset of the high speed medium access control entity.

The high speed medium access control entity may specifically include a MAC-hs entity or a MAC-ehs entity.

102. The User Equipment Determines the to-be-Reset Cell According to the Reset Indication information and resets the high speed medium access control entity only for the to-be-reset cell.

The to-be-reset cell is marked in the reset indication information, and therefore the user equipment can determine the to-be-reset cell according to the reset indication information.

When the user equipment performs the cell handover, the user equipment receives the reset instruction sent from the radio network controller, determines the to-be-reset cell according to the reset indication information, and performs reset of the high speed medium access control entity for the to-be-reset cell, thereby avoiding an abnormal behavior of the user equipment, avoiding unnecessary reset of the high speed medium access control entity, and improving user experience.

Figure 2:
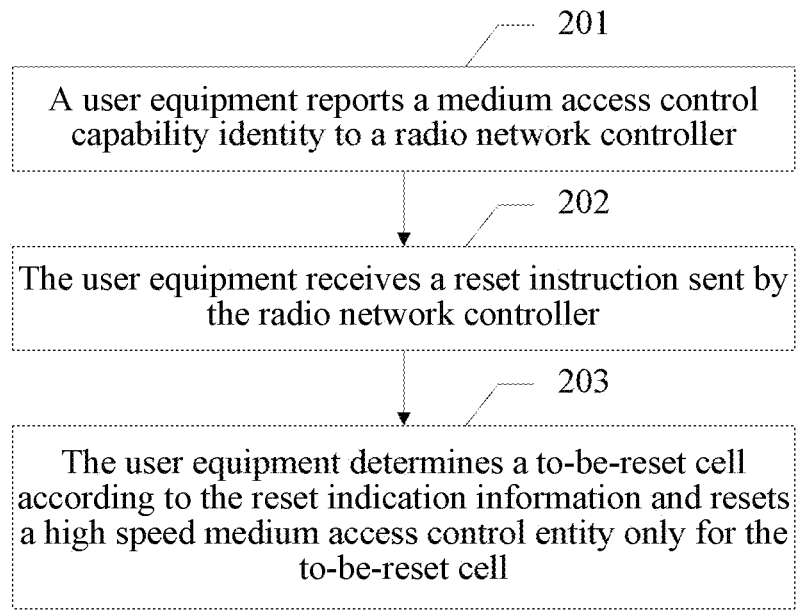
FIG. 2 is a schematic diagram of another embodiment of the method for resetting a high speed medium access control entity according to the present invention.

In a practical application, the user equipment may not have a capability of resetting at least one high speed medium access control entity, and the capability also includes: (1) after a handover, concurrently resetting, by the user equipment, two or more high speed medium access control entities; and (2) resetting one of the high speed medium access control entities, without resetting at least one another high speed medium access control entity. Therefore, if the user equipment does not have the capability, when the UE receives the reset instruction, the UE may directly ignore the reset instruction, or this may lead to an abnormal behavior of the user equipment (behavior inconsistent with that on a network side), thereby wasting signaling overhead on the network side. The present invention provides a corresponding solution. For details, refer to FIG. 2, which is a schematic flowchart of a method for resetting a high speed medium access control entity according to another embodiment of the present invention.

201. A User Equipment Reports a Medium Access Control Capability Identifier to a Radio Network Controller.

The user equipment reports the MAC capability identifier to the radio network controller, where the MAC capability identifier is configured to identify whether the user equipment has a capability of resetting at least one high speed medium access control entity, and the capability also includes: (1) after a handover, concurrently resetting, by the user equipment, two or more high speed medium access control entities; and (2) resetting one of the high speed medium access control entities, without resetting at least one another high speed medium access control entity, so that the radio network controller may determine, according to the MAC capability identifier, whether to send a reset instruction to the user equipment after the user equipment occurs a cell handover, thereby avoiding generation of invalid signaling.

Optionally, the user equipment may report the MAC capability identifier through uplink radio resource control (RRC) signaling.

202. The User Equipment Receives the Reset Instruction Sent from the Radio Network Controller.

The user equipment receives the reset instruction sent from the radio network controller, where the reset instruction includes reset indication information of a cell.

When the cell handover (which may specifically be an HS-DSCH serving cell handover) occurs, a network-side device (for example, a base station or the radio network controller) may determine, according to information about cells before and after the cell handover, a cell that requires reset of a high speed medium access control entity, and the network-side device may indicate a to-be-reset cell in the reset instruction via the reset indication information of the cell.

Optionally, the user equipment may receive the reset instruction via downlink RRC signaling.

Optionally, the reset indication information of the cell may be a reset indicator bit in cell configuration information or multiflow transmission configuration information, where configuration information of different cells may be distinguished according to identification information of the cells, for example, scrambling codes of the cells. For example, in cell configuration information of each cell, "1" or "TRUE" may be used to mark a cell as a to-be-reset cell, and "0" or "FALSE" may be used to mark a cell as a not-to-be-reset cell. In addition, the reset indication information of the cell may also be an identifier of a to-be-reset cell or an identifier of a not-to-be-reset cell, that is, adding cell identification information into the reset instruction to mark a to-be-reset cell or a not-to-be-reset cell; and when it is an identifier of a not-to-be-reset cell, it is determined that a cell among cells that participate in HS-DSCH data transmission after the cell handover except for the not-to-be-reset cell is the to-be-reset cell.

Further, the reset indication information of the cell may be carried only in cell configuration information of a non-primary cell, for example, configuration information of an assisting cell, a secondary cell, or an assisting secondary cell. When it is carried in the configuration information of these cells, the reset indication information indicates the same content as described above.

203. The User Equipment Determines the to-be-Reset Cell According to the Reset Indication Information and Resets the High Speed Medium Access Control Entity Only for the to-be-Reset Cell.

The to-be-reset cell is marked in the reset indication information, and therefore the user equipment may determine the to-be-reset cell according to the reset indication information.

The to-be-reset cell is a cell that mapping information between the high speed medium access control entity and the cell changes after the cell handover.

Exemplarily, a procedure of resetting, by the user equipment, the high speed medium access control entity specifically includes: clearing data buffered in all HARQ processes, setting a TSN to 0, setting all MAC-layer variables to a initial-status value, clearing a cache for a reordering queue, and the like. For details, reference may be made to the description in section 11.6.2.5 MAC-hs Reset of protocol 25.321 Release 11.1.0.

Figure 3:
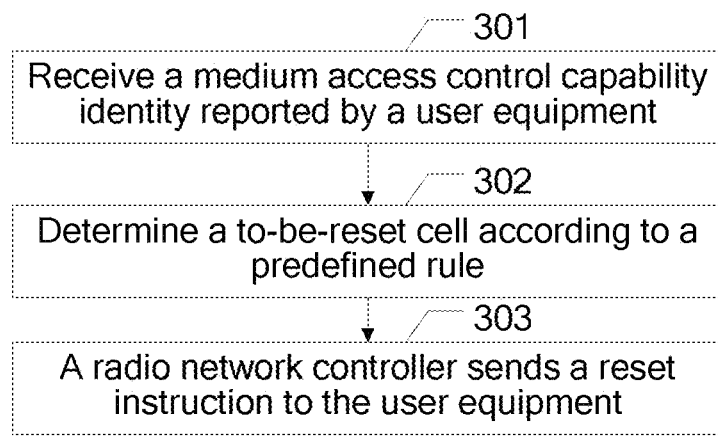
FIG. 3 is a schematic diagram of another embodiment of the method for resetting a high speed medium access control entity according to the present invention.

The following describes a method for resetting a high speed medium access control entity in the preset invention by a radio network controller as a network-side device. Referring to FIG. 3, FIG. 3 is a schematic flowchart of a method for resetting a high speed medium access control entity according to another embodiment of the present invention.

301. Receive a Medium Access Control Capability Identifier Reported by a User Equipment.

Optionally, a radio network controller receives the MAC capability identifier reported by the user equipment, where the MAC capability identifier is configured to identify whether the user equipment has a capability of resetting at least one high speed medium access control entity, so that the radio network controller may determine, according to the MAC capability identifier, whether to send a reset instruction to a user equipment undergoing a cell handover, thereby avoiding generation of invalid signaling.

Optionally, the user equipment may report the MAC capability identifier through uplink RRC signaling.

Step 301 is an optional step, that is, if the radio network controller does not receive the medium access control capability identifier reported by the user equipment, the radio network controller may send the reset instruction to the user equipment no matter whether the user equipment has the capability of resetting at least one high speed medium access control entity.

302. Determine a to-be-Reset Cell According to a Predefined Rule.

The radio network controller determines the to-be-reset cell according to the predefined rule, where the to-be-reset cell is a cell for which the user equipment undergoing the cell handover needs to reset a high speed medium access control entity.

Optionally, the predefined rule may be as follows:

If one cell that participates in HS-DSCH data transmission after the cell handover is one of cells before the cell handover, and the user equipment is in a multiflow transmission status before or after the cell handover, the cell is a not-to-be-reset cell; or if one cell that participates in HS-DSCH data transmission after the cell handover and any cell that participates in HS-DSCH data transmission before the cell handover belong to a same base station, and the user equipment is in a multiflow status before or after the cell handover, the cell is a not-to-be-reset cell.

A cell among cells that participate in HS-DSCH data transmission after the cell handover is determined except for the not-to-be-reset cell as the to-be-reset cell.

Specifically, the Multiflow status includes: an SF-DC status, a DF-3C status, a DF-4C status, and the like. Moreover, the Multiflow status may further include: a DF-DC status (at two frequency points, two cells participate in HS-DSCH data transmission), an SF-3C status (at one frequency point, three cells participate in HS-DSCH data transmission), a 3F-6C status (at three frequency points, six cells participate in HS-DSCH data transmission), and a 4F-8C status (at four frequency points, eight cells participate in HS-DSCH data transmission).

It should be understood that in practical applications, there are other methods for determining the to-be-reset cell, and no specific limitations are set herein.

303. The Radio Network Controller Sends the Reset Instruction to the User Equipment.

The radio network controller sends the reset instruction to the user equipment, so that the user equipment resets the high speed medium access control entity for the to-be-reset cell indicated in the reset instruction. The reset instruction includes reset indication information of a cell. The reset indication information of the cell is configured to indicate a cell that requires reset of a high speed medium access control entity (to-be-reset cell for short).

Optionally, the radio network controller may send the reset instruction to the user equipment through downlink RRC signaling.

Figure 4:
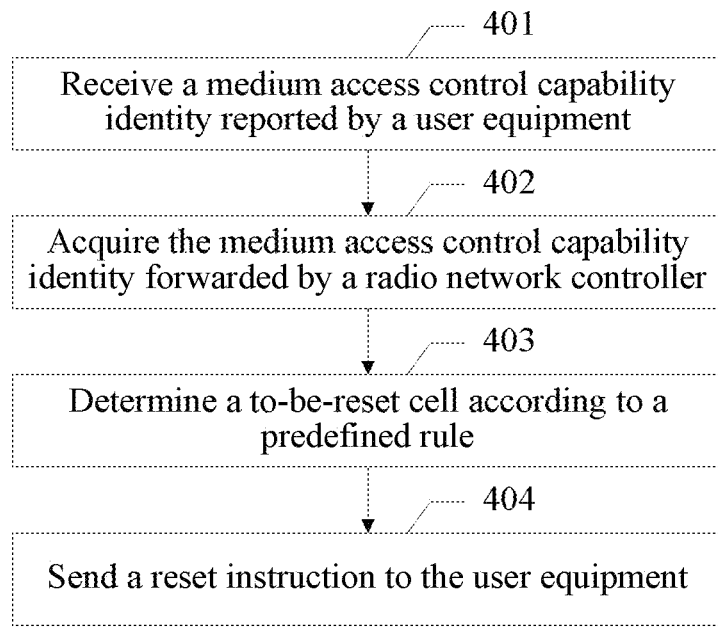
FIG. 4 is a schematic diagram of another embodiment of the method for resetting a high speed medium access control entity according to the present invention.

The following describes a method for resetting a high speed medium access control entity in the preset invention by taking a radio network controller and a base station (NodeB) as network-side devices. Refer to FIG. 4, which is a schematic flowchart of a method for resetting a high speed medium access control entity according to another embodiment of the present invention.

401. Receive a Medium Access Control Capability Identifier Reported by a User Equipment.

Optionally, the radio network controller receives the MAC capability identifier reported by the user equipment, where the MAC capability identifier is configured to identify whether the user equipment has a capability of resetting at least one high speed medium access control entity. The capability concurrently includes: (1) after a handover, concurrently resetting, by the user equipment, two or more high speed medium access control entities; and (2) resetting one of the high speed medium access control entities, without resetting at least one another high speed medium access control entity.

Optionally, the user equipment may report the MAC capability identifier through uplink RRC signaling.

Step 401 is an optional step, that is, if the radio network controller does not receive the medium access control capability identifier reported by the user equipment, the radio network controller may send a reset instruction to the user equipment no matter whether the user equipment has the capability of resetting at least one high speed medium access control entity.

402. Acquire the Medium Access Control Capability Identifier Forwarded by the Radio Network Controller.

The base station acquires the MAC capability identifier forwarded by the radio network controller and determines, according to the MAC capability identifier, whether to send the reset instruction to the user equipment undergoing a cell handover, thereby avoiding generation of invalid signaling.

403. Determine a to-be-Reset Cell According to a Predefined Rule.

The base station determines the to-be-reset cell according to the predefined rule and notifies the radio network controller of a determination result of the to-be-reset cell.

The to-be-reset cell is a cell for which the user equipment undergoing the cell handover needs to reset a high speed medium access control entity.

Optionally, the predefined rule may be as follows:

If one cell that participates in HS-DSCH data transmission after the cell handover is one of cells before the cell handover, and the user equipment is in a multiflow transmission status before or after the cell handover, the cell is a not-to-be-reset cell; or if one cell that participates in HS-DSCH data transmission after the cell handover and any cell that participates in HS-DSCH data transmission before the cell handover belong to a same base station, and the user equipment is in a multiflow status before or after the cell handover, the cell is a not-to-be-reset cell.

A cell among cells that participate in HS-DSCH data transmission after the cell handover is determined except for the not-to-be-reset cell as the to-be-reset cell.

Specifically, the Multiflow status includes: an SF-DC status, a DF-3C status, a DF-4C status, and the like. Moreover, the Multiflow status may further include: a DF-DC status (at two frequency points, two cells participate in HS-DSCH data transmission), an SF-3C status (at one frequency point, three cells participate in HS-DSCH data transmission), a 3F-6C status (at three frequency points, six cells participate in HS-DSCH data transmission), and a 4F-8C status (at four frequency points, eight cells participate in HS-DSCH data transmission).

It should be understood that in practical applications, there are other methods for determining the to-be-reset cell, and no specific limitations are set herein.

404. Send the Reset Instruction to the User Equipment.

After acquiring the to-be-reset cell through the base station, the radio network controller sends the reset instruction to the user equipment, so that the user equipment resets a high speed medium access control entity for the to-be-reset cell indicated in the reset instruction. The reset instruction includes reset indication information of a cell.

Optionally, the radio network controller may send the reset instruction to the user equipment through downlink RRC signaling.

Figure 5:
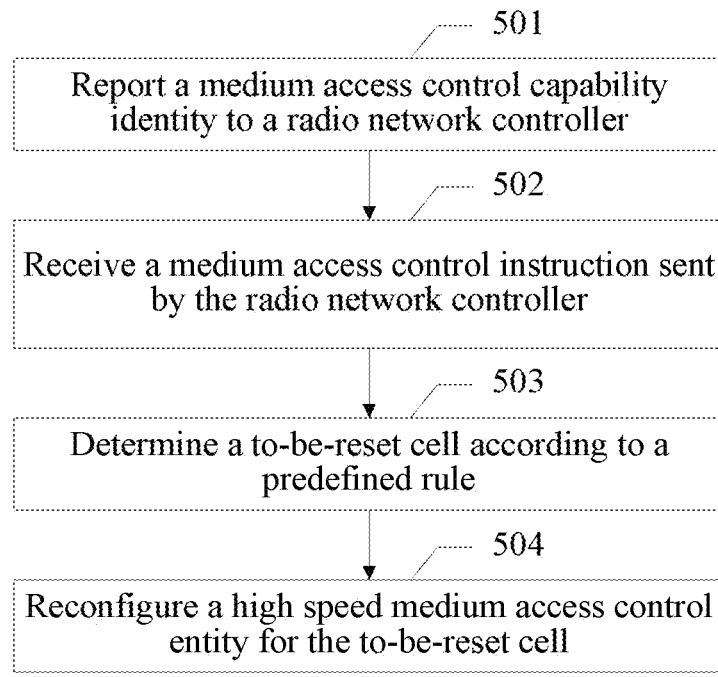
FIG. 5 is a schematic diagram of another embodiment of the method for resetting a high speed medium access control entity according to the present invention.

In practical applications, the to-be-reset cell may be determined by a user equipment. Refer to FIG. 5, which is a schematic flowchart of a method for resetting a high speed medium access control entity according to another embodiment of the present invention.

501. Report a Medium Access Control Capability Identifier to a Radio Network Controller.

Optionally, the user equipment reports the MAC capability identifier to the radio network controller, where the MAC capability identifier is configured to identify whether the user equipment has a capability of resetting at least one high speed medium access control entity, and the capability concurrently includes: (1) after a handover, concurrently resetting, by the user equipment, two or more high speed medium access control entities; and (2) resetting one of the high speed medium access control entities, without resetting at least one another high speed medium access control entity, so that the radio network controller may determine, according to the MAC capability identifier, whether to send a MAC control instruction to the user equipment undergoing a cell handover, thereby avoiding generation of invalid signaling.

Optionally, the user equipment may report the MAC capability identifier through uplink RRC signaling.

502. Receive a medium access control instruction sent from the radio network controller.

The user equipment receives the MAC control instruction sent from the radio network controller, where the MAC control instruction is configured to instruct the user equipment to determine a to-be-reset cell.

503. Determine a to-be-Reset Cell According to a Predefined Rule.

The user equipment determines the to-be-reset cell according to the predefined rule. Optionally, the predefined rule may be as follows:

If one cell that participates in HS-DSCH data transmission after the cell handover is one of cells before the cell handover, and the user equipment is in a multiflow transmission status before or after the cell handover, the cell is a not-to-be-reset cell; or if one cell that participates in HS-DSCH data transmission after the cell handover and any cell that participates in HS-DSCH data transmission before the cell handover belong to a same base station, and the user equipment is in a multiflow status before or after the cell handover, the cell is a not-to-be-reset cell.

A cell among cells that participate in HS-DSCH data transmission after the cell handover is determined except for the not-to-be-reset cell as the to-be-reset cell.

Specifically, the Multiflow status includes: an SF-DC status, a DF-3C status, a DF-4C status, and the like. Moreover, the Multiflow status may further include: an SF-3C status (at a same frequency point, three cells participate in HS-DSCH data transmission), a 3F-6C status (at three frequency points, six cells participate in HS-DSCH data transmission), and a 4F-8C status (at four frequency points, eight cells participate in HS-DSCH data transmission).

It should be understood that in practical applications, there are other methods for determining the to-be-reset cell, and no specific limitations are set herein.

504. Reset a High Speed Medium Access Control Entity for the to-be-Reset Cell.

The to-be-reset cell is marked in reset indication information, and therefore the user equipment may determine the to-be-reset cell according to the reset indication information.

Exemplarily, resetting, by the user equipment, the high speed medium access control entity is specifically: clearing data buffered in all HARQ processes, setting a TSN to 0, setting all MAC-layer variables to initial-status values, clearing a cache for a reordering queue, and the like. For details, reference may be made to the description in section 11.6.2.5 MAC-hs Reset of protocol 25.321 Release 11.1.0.

Figure 6:
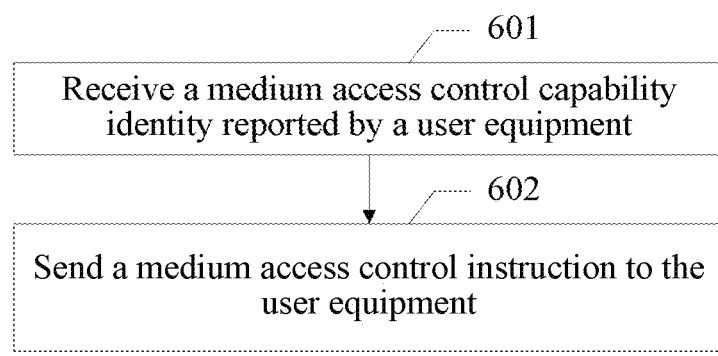
FIG. 6 is a schematic diagram of another embodiment of the method for resetting a high speed medium access control entity according to the present invention.

The following describes a method for resetting a high speed medium access control entity in the preset invention from the perspective of a radio network controller. Referring to FIG. 6, another embodiment of a method for resetting a high speed medium access control entity among the embodiments of the present invention includes the following steps:

601. Receive a Medium Access Control Capability Identifier Reported by a User Equipment.

Optionally, the radio network controller receives the MAC capability identifier reported by the user equipment, where the MAC capability identifier is configured to identify whether the user equipment has a capability of resetting at least one high speed medium access control entity, and the capability concurrently includes: (1) after a handover, concurrently resetting, by the user equipment, two or more high speed medium access control entities; and (2) resetting one of the high speed medium access control entities, without resetting at least one another high speed medium access control entity, so that the radio network controller may determine, according to the MAC capability identifier, whether to send a MAC control instruction to the user equipment undergoing a cell handover, thereby avoiding generation of invalid signaling.

Optionally, the user equipment may report the MAC capability identifier through uplink RRC signaling.

Step 601 is an optional step, that is, if the radio network controller does not receive the medium access control capability identifier reported by the user equipment, the radio network controller may send the MAC control instruction to the user equipment no matter whether the user equipment has the capability of resetting at least one high speed medium access control entity.

602. Send the Medium Access Control Instruction to the User Equipment.

The radio network controller sends the MAC control instruction to the user equipment, where the MAC control instruction is configured to instruct the user equipment to determine a to-be-reset cell according to a predefined rule, and resets a high speed medium access control entity for the to-be-reset cell.

Optionally, the radio network controller may send the MAC control instruction to the user equipment through downlink RRC signaling.

Figure 7:
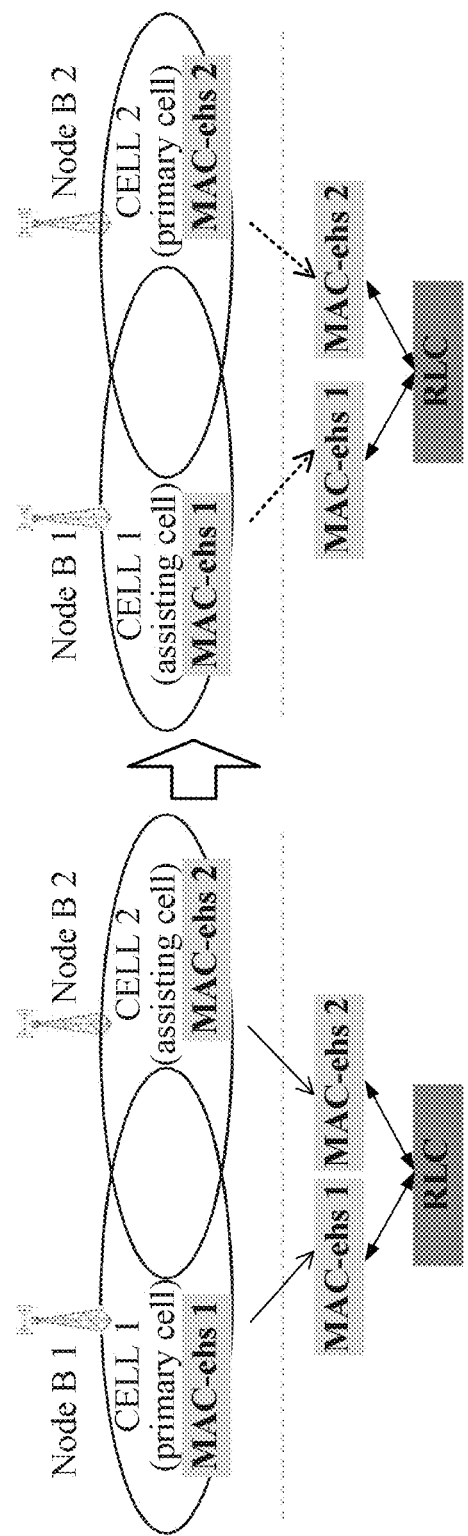
FIG. 7 is a schematic diagram of a cell handover according to an embodiment of the present invention.

For ease of comprehension, with reference to some specific application scenarios, the following describes in further detail the method for resetting a high speed medium access control entity described in the preceding embodiments, and the details are as follows:

Referring to FIG. 7, on the left side of FIG. 7, a user equipment works on an Inter-Node B SF-DC, a CELL 1 is a primary cell, and a CELL 2 is an assisting cell; and when the user equipment is handed over to the right side of FIG. 7, that is, the SF-DC cell remains unchanged, but the CELL 2 becomes the primary cell and the CELL 1 becomes the assisting cell.

A radio network controller determines that the CELL 1 and the CELL 2 are not-to-be-reset cells according to a predefined rule, marks the CELL 1 and the CELL 2 as not-to-be-reset cells in reset indication information of a cell, and sends a reset instruction in which the reset indication information of the cell is set to the user equipment; and after receiving the reset instruction, the user equipment determines that both the CELL 1 and the CELL 2 are not-to-be-reset cells, and therefore a current high speed medium access control entity remains unchanged.

Although roles of the primary cell and the assisting cell that CELL 1 and CELL 2 play change before and after the handover, the user equipment can still retain a mapping relationship between a MAC-ehs and a cell. Therefore, the user equipment can continuously receive downlink data of a corresponding cell from the MAC-ehs after the handover.

Figure 8:
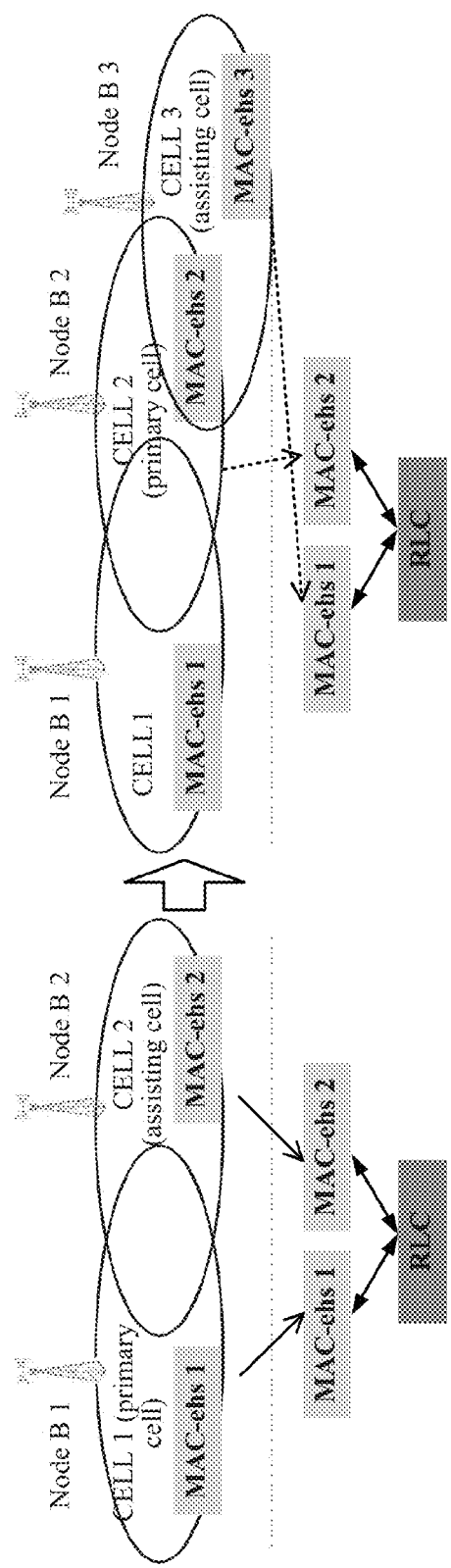
FIG. 8 is another schematic diagram of a cell handover according to an embodiment of the present invention.

Referring to FIG. 8, a user equipment is handed over from an Inter-Node B SF-DC (the CELL 1 is a primary cell, and the CELL 2 is an assisting cell) on the left side of FIG. 8 to an Inter-Node B SF-DC (the CELL 2 is the primary cell, and a CELL 3 is the assisting cell) on the right side of FIG. 8, where the CELL 1 and the CELL 3 are located on different Node Bs.

A radio network controller determines that the CELL 2 is a not-to-be-reset cell and the CELL 3 is a to-be-reset cell according to a predefined rule, makes corresponding marks in reset indication information of a cell, and sends a reset instruction in which the reset indication information of the cell is set to the user equipment; and after receiving the reset instruction, the user equipment retains mapping information (that is, between MAC-ehs2 and the CELL 2) before the handover for the CELL 2 and resets an MAC-ehs for the CELL 3, and then the user equipment receives downlink data of a corresponding cell from the MAC-ehs.

Figure 9:
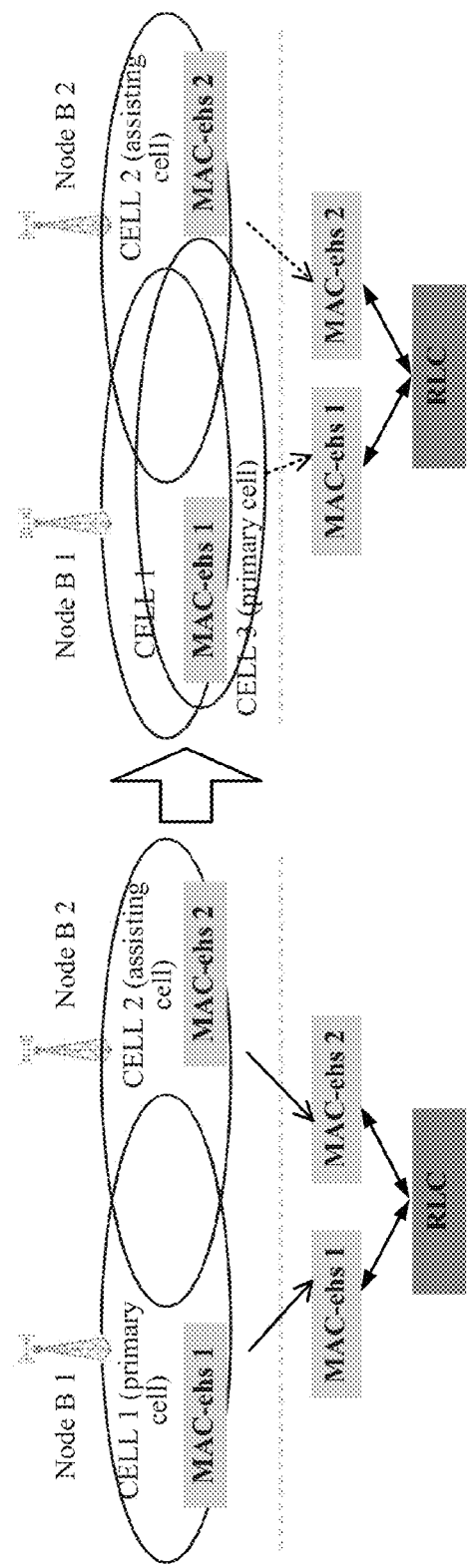
FIG. 9 is another schematic diagram of a cell handover according to an embodiment of the present invention.

Referring to FIG. 9, a user equipment is handed over from an Inter-Node B SF-DC (the CELL 1 is a primary cell, and the CELL 2 is an assisting cell) to an Inter-Node B SF-DC (the CELL 2 is the primary cell, and the CELL 3 is the assisting cell), where the CELL 1 and the CELL 3 are located on a same Node B.

A radio network controller determines that the CELL 2 and the CELL 3 are not-to-be-reset cells according to a predefined rule, marks the CELL 2 and the CELL 3 as not-to-be-reset cells in reset indication information of a cell, and sends a reset instruction in which the reset indication information of the cell is set to the user equipment; and after receiving the reset instruction, the user equipment retains mapping information (that is, between MAC-ehs2 and the CELL 2) before the handover for the CELL 2 and changes a mapping relationship between MAC-ehs1 and CELL1 to one between MAC-ehs1 and the CELL3 for the CELL 3, and then the user equipment receives downlink data of a corresponding cell from a MAC-ehs.

Figure 10:
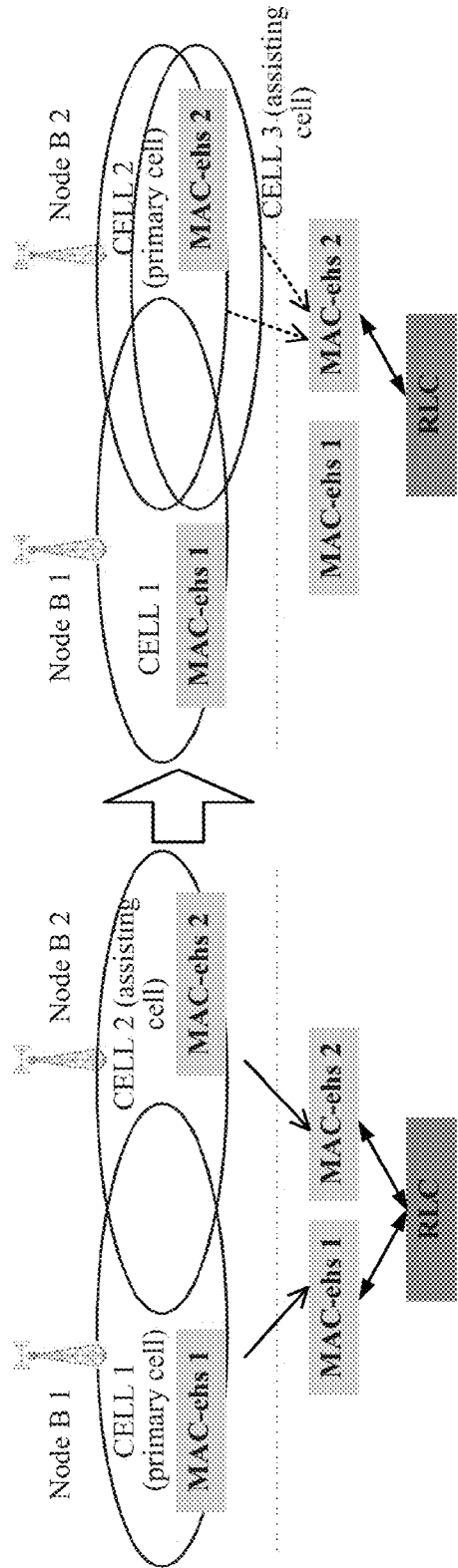
FIG. 10 is another schematic diagram of a cell handover according to an embodiment of the present invention.

Referring to FIG. 10, a user equipment is handed over from an Inter-Node B SF-DC (the CELL 1 is a primary cell, and the CELL 2 is an assisting cell) to an Intra-Node B SF-DC (the CELL 2 is the primary cell, and the CELL 3 is the assisting cell), where the CELL 1 and the CELL 3 are located on different Node Bs, and the CELL 2 and the CELL 3 are located on a same Node B.

A radio network controller determines that the CELL 2 and the CELL 3 are not-to-be-reset cells according to a predefined rule, marks the CELL 2 and the CELL 3 as not-to-be-reset cells in reset indication information of a cell, and sends a reset instruction in which the reset indication information of the cell is set to the user equipment; and after receiving the reset instruction, the user equipment retains mapping information (that is, between MAC-ehs2 and the CELL 2) before the handover for the CELL 2 and adds a mapping relationship between MAC-ehs2 and the CELL3 for the CELL 3, and then the user equipment receives downlink data of a corresponding cell from a MAC-ehs.

Figure 11:
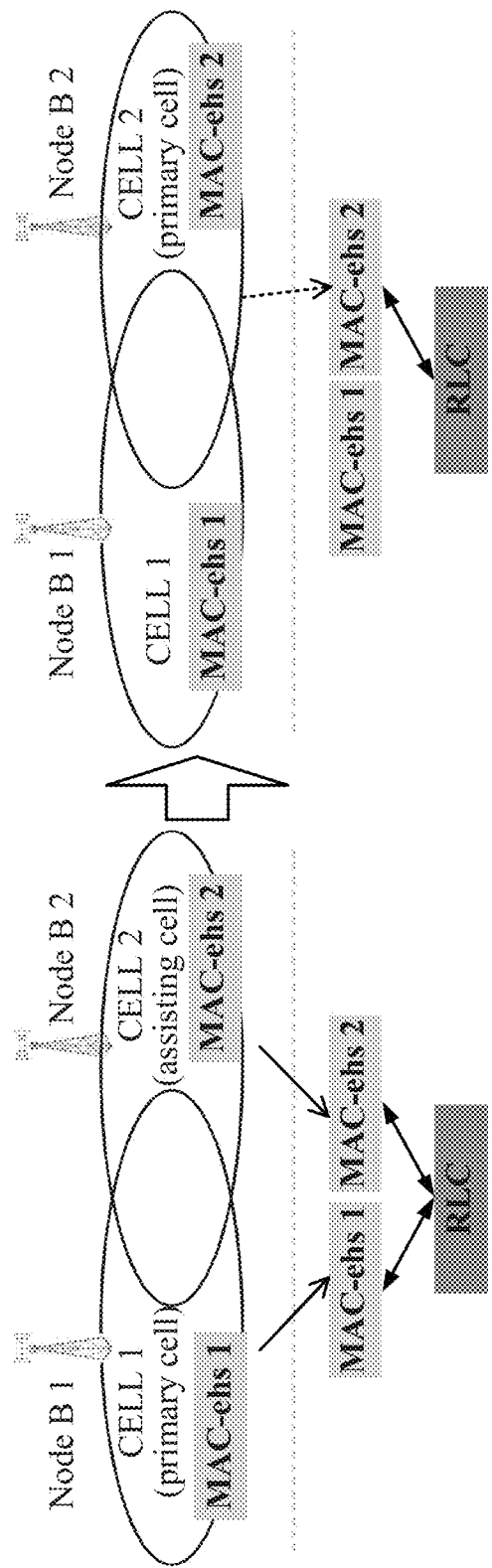
FIG. 11 is another schematic diagram of a cell handover according to an embodiment of the present invention.

Referring to FIG. 11, a user equipment is handed over from an Inter-Node B SF-DC (the CELL 1 is a primary cell, and the CELL 2 is an assisting cell) to a single-flow cell (the CELL 2 is the primary cell).

A radio network controller determines that the CELL 2 is a not-to-be-reset cell according to a predefined rule, marks the CELL 2 as a not-to-be-reset cell in reset indication information of a cell, and sends a reset instruction in which the reset indication information of the cell is set to the user equipment; and after receiving the reset instruction, the user equipment retains mapping information (that is, between MAC-ehs2 and the CELL 2) before the handover for the CELL 2, and then the user equipment receives downlink data of a corresponding cell from a MAC-ehs.

The preceding describes application scenarios in the embodiments of the present invention by only taking some examples. It should be understood that in practical applications, there are more application scenarios. No specific limitations are set herein.

Figure 12:
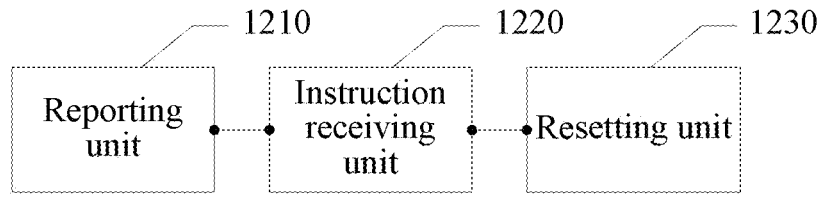
FIG. 12 is a schematic structural diagram of a user equipment according to the present invention.

The following describes an embodiment of a user equipment that implements the preceding method for resetting a high speed medium access control entity. Referring to FIG. 12, an embodiment of a user equipment among the embodiments of the present invention includes: an instruction receiving unit 1210, configured to receive a reset instruction sent from a radio network controller, where the reset instruction includes reset indication information of a cell; and a resetting unit 1220, configured to determine a to-be-reset cell according to the reset indication information and reset a high speed medium access control entity for the to-be-reset cell.

In another embodiment of the present invention, the user equipment further includes a reporting unit 1230, configured to report a medium access control (MAC) capability identifier to the radio network controller, where the MAC capability identifier is configured to identify whether the user equipment has a capability of resetting at least one high speed medium access control entity.

Specific operations of units in the embodiment of the present invention include the following: The reporting unit 1230 reports the MAC capability identifier to the radio network controller, where the MAC capability identifier is configured to identify whether the user equipment has the capability of resetting at least one high speed medium access control entity, and the capability concurrently includes: (1) after a handover, concurrently resetting, by the user equipment, two or more high speed medium access control entities; and (2) resetting one of the high speed medium access control entities, without resetting at least one another high speed medium access control entity, so that the radio network controller may determine, according to the MAC capability identifier, whether to send the reset instruction to the user equipment undergoing a cell handover, thereby avoiding generation of invalid signaling. Optionally, the MAC capability identifier may be reported through uplink RRC signaling.

The instruction receiving unit 1210 receives the reset instruction sent from the radio network controller, where the reset instruction includes reset indication information of a cell. The reset indication information of the cell is configured to indicate a cell that requires reset of a high speed medium access control entity (to-be-reset cell for short).

When the cell handover (which may specifically be an HS-DSCH serving cell handover) occurs, a network-side device (for example, a base station or the radio network controller) may determine, according to information about cells before and after the cell handover, the cell that requires reset of the high speed medium access control entity, and the network-side device may use the reset indication information of the cell to indicate the to-be-reset cell in the reset instruction.

Optionally, the reset instruction may be received through downlink RRC signaling.

Optionally, the reset indication information of the cell may be a reset indicator bit in cell configuration information. For example, in cell configuration information of each cell, "1" or "TRUE" may be used to mark a cell as a to-be-reset cell, and "0" or "FALSE" may be used to mark a cell as a not-to-be-reset cell. The reset indication information of the cell may also be an identifier of a to-be-reset cell or an identifier of a not-to-be-reset cell, that is, adding cell identification information into the reset instruction to mark a to-be-reset cell or a not-to-be-reset cell.

Further, the reset indication information of the cell may be carried only in cell configuration information of a non-primary cell, for example, configuration information of an assisting cell, a secondary cell, or an assisting secondary cell. When it is carried in the configuration information of these cells, the reset indication information indicates the same content as described above.

After receiving the reset instruction, the resetting unit 1220 determines the to-be-reset cell according to the reset indication information and resets the high speed medium access control entity for the to-be-reset cell.

The to-be-reset cell is marked in the reset indication information, and therefore the user equipment may determine the to-be-reset cell according to the reset indication information.

The to-be-reset cell is a cell that mapping information between the high speed medium access control entity and the cell changes after the cell handover.

Exemplarily, resetting, by the user equipment, the high speed medium access control entity is specifically: clearing data buffered in all HARQ processes, setting a TSN to 0, setting all MAC-layer variables to initial-status values, clearing a cache for a reordering queue, and the like. For details, reference may be made to the description in section 11.6.2.5 MAC-hs Reset of protocol 25.321 Release 11.1.0.

Figure 13:
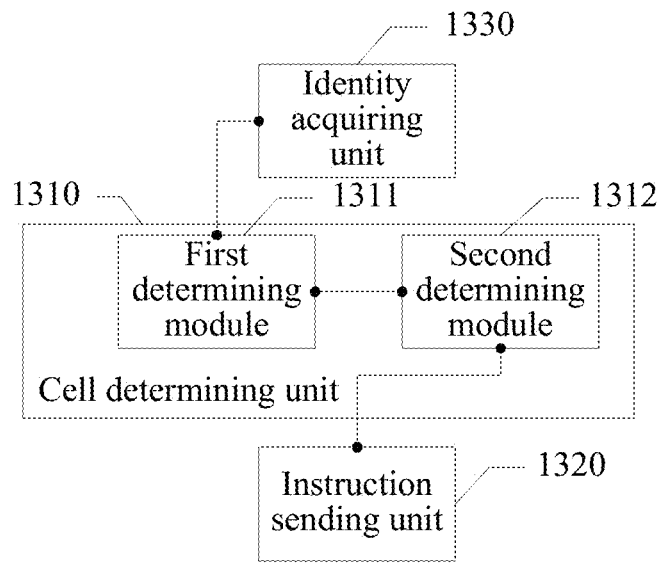
FIG. 13 is a schematic structural diagram of a network-side device according to the present invention.

The following describes an embodiment of a network-side device that implements the preceding method for resetting a high speed medium access control entity. The network-side device may be a base station or a radio network controller. Referring to FIG. 13, an embodiment of a network-side device among the embodiments of the present invention includes: a cell determining unit 1310, configured to determine a to-be-reset cell according to a predefined rule, where the to-be-reset cell is a cell for which a user equipment undergoing a cell handover needs to reset a high speed medium access control entity; and an instruction sending unit 1320, configured to send a reset instruction to the user equipment, so that the user equipment resets the high speed medium access control entity for the to-be-reset cell indicated in the reset instruction, where the reset instruction includes reset indication information of a cell.

In another embodiment of the present invention, the user equipment further includes an identifier acquiring unit 1330, configured to acquire a MAC capability identifier, where the MAC capability identifier is configured to identify whether the user equipment has a capability of resetting at least one high speed medium access control entity.

In another embodiment of the present invention, the cell determining unit 1310 includes: a first determining module 1311, configured to, if one cell that participates in high speed downlink shared channel (HS-DSCH) data transmission after the cell handover is one of cells before the cell handover, and the user equipment is in a multiflow transmission status before or after the cell handover, determine that the cell is a not-to-be-reset cell, or if one cell that participates in HS-DSCH data transmission after the cell handover and any cell that participates in HS-DSCH data transmission before the cell handover belong to a same base station, and the user equipment is in a multiflow transmission status before or after the cell handover, determine that the cell is a not-to-be-reset cell; and a second determining module 1312, configured to determine a cell among cells that participate in HS-DSCH data transmission after the cell handover except for the not-to-be-reset cell as the to-be-reset cell.

Specific operations of units in the embodiment of the present invention include the following: The identifier acquiring unit 1330 receives the MAC capability identifier reported by the user equipment, where the MAC capability identifier is configured to identify whether the user equipment has the capability of resetting at least one high speed medium access control entity, so that the radio network controller may determine, according to the MAC capability identifier, whether to send the reset instruction to the user equipment undergoing the cell handover, thereby avoiding generation of invalid signaling.

Optionally, the MAC capability identifier may be reported through uplink RRC signaling.

The cell determining unit 1310 determines the to-be-reset cell according to the predefined rule, where the to-be-reset cell is a cell for which the user equipment undergoing the cell handover needs to reset a high speed medium access control entity.

The first determining module 1311 may determine a not-to-be-reset cell. Specifically, if one cell that participates in HS-DSCH data transmission after the cell handover is one of cells before the cell handover, and the user equipment is in a multiflow transmission status before or after the cell handover, the cell is a not-to-be-reset cell; or if one cell that participates in HS-DSCH data transmission after the cell handover and any cell that participates in HS-DSCH data transmission before the cell handover belong to a same base station, and the user equipment is in a multiflow transmission status before or after the cell handover, the cell is a not-to-be-reset cell. Then, the second determining module 1312 is configured to determine a cell among cells that participate in HS-DSCH data transmission after the cell handover except for the not-to-be-reset cell as the to-be-reset cell.

After the to-be-reset cell is determined, the instruction sending unit 1320 sends the reset instruction to the user equipment, so that the user equipment resets a high speed medium access control entity for the to-be-reset cell indicated in the reset instruction. The reset instruction includes reset indication information of a cell.

Optionally, the reset instruction may be sent to the user equipment through downlink RRC signaling.

Figure 14:
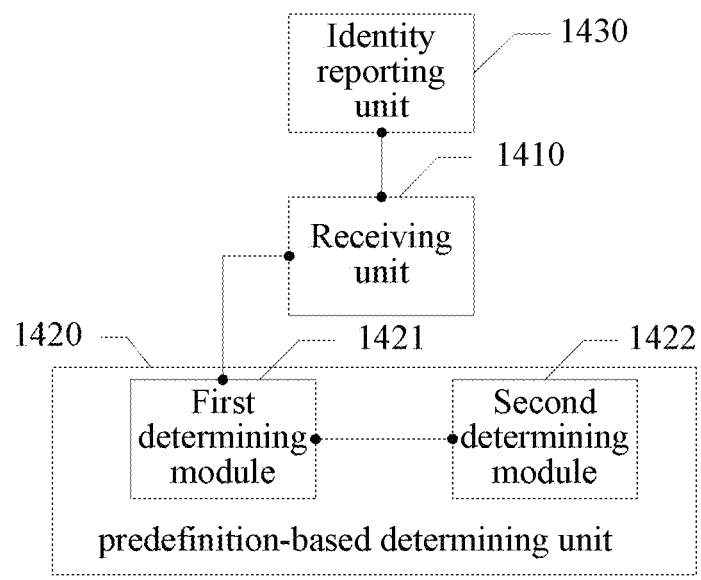
FIG. 14 is another schematic structural diagram of the user equipment according to the present invention.

The following describes an embodiment of a user equipment that implements the preceding method for resetting a high speed medium access control entity. Referring to FIG. 14, another embodiment of a user equipment among the embodiments of the present invention includes: a receiving unit 1410, configured to receive a MAC control instruction sent from a radio network controller, where the MAC control instruction is configured to instruct the user equipment to determine a to-be-reset cell; and a predefinition-based determining unit 1420, configured to determine the to-be-reset cell according to a predefined rule and reset a high speed medium access control entity for the to-be-reset cell.

In another embodiment of the present invention, the predefinition-based determining unit 1420 includes: a first determining module 1421, configured to: if one cell that participates in high speed downlink shared channel (HS-DSCH) data transmission after the cell handover is one of cells before the cell handover, and the user equipment is in a multiflow transmission status before or after the cell handover, determine that the cell is a not-to-be-reset cell; or if one cell that participates in HS-DSCH data transmission after the cell handover and any cell that participates in HS-DSCH data transmission before the cell handover belong to a same base station, and the user equipment is in a multiflow transmission status before or after the cell handover, determine that the cell is a not-to-be-reset cell; and a second determining module 1422, configured to determine a cell among cells that participate in HS-DSCH data transmission after the cell handover except for the not-to-be-reset cell as the to-be-reset cell.

In another embodiment of the present invention, the user equipment further includes an identifier reporting unit 1430, configured to report a medium access control (MAC) capability identifier to the radio network controller, where the MAC capability identifier is configured to identify whether the user equipment has a capability of resetting at least one high speed medium access control entity.

Specific operations of units in the embodiment of the present invention include the following: The reporting unit 1430 reports the MAC capability identifier to the radio network controller, where the MAC capability identifier is configured to identify whether the user equipment has the capability of resetting at least one high speed medium access control entity, and the capability concurrently includes: (1) after a handover, concurrently resetting, by the user equipment, two or more high speed medium access control entities; and (2) resetting one of the high speed medium access control entities, without resetting at least one another high speed medium access control entity, so that the radio network controller may determine, according to the MAC capability identifier, whether to send a MAC control instruction to the user equipment undergoing the cell handover, thereby avoiding generation of invalid signaling.

Optionally, the MAC capability identifier may be reported through uplink RRC signaling.

The receiving unit 1410 receives the MAC control instruction sent from the radio network controller, where the MAC control instruction is configured to instruct the user equipment to determine the to-be-reset cell.

The predefinition-based determining unit 1420 determines the to-be-reset cell according to the predefined rule and resets the high speed medium access control entity for the to-be-reset cell.

The first determining module 1421 may determine a not-to-be-reset cell. Specifically, if one cell that participates in high speed downlink shared channel (HS-DSCH) data transmission after the cell handover is one of cells before the cell handover, and the user equipment is in a multiflow transmission status before or after the cell handover, the cell is a not-to-be-reset cell; or if one cell that participates in HS-DSCH data transmission after the cell handover and any cell that participates in HS-DSCH data transmission before the cell handover belong to a same base station, and the user equipment is in a multiflow transmission status before or after the cell handover, the cell is a not-to-be-reset cell. Then, the second determining module 1422 determines a cell among cells that participate in HS-DSCH data transmission after the cell handover except for the not-to-be-reset cell as the to-be-reset cell.

Figure 15:
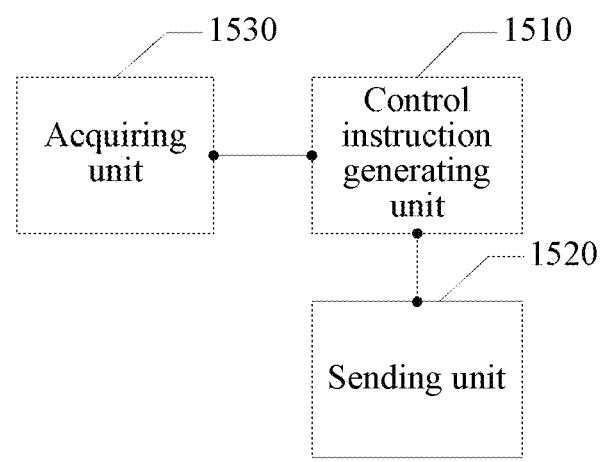
FIG. 15 is another schematic structural diagram of the network-side device according to the present invention.

The following describes an embodiment of a network-side device that implements the preceding method for resetting a high speed medium access control entity. The network-side device may exemplarily be a base station or a radio network controller. Referring to FIG. 15, another embodiment of a network-side device among the embodiments of the present invention includes: a control instruction generating unit 1510, configured to generate a MAC control instruction; and a sending unit 1520, configured to send the MAC control instruction to a user equipment, where the MAC control instruction is configured to instruct the user equipment to determine a to-be-reset cell according to a predefined rule, and reset a high speed medium access control entity for the to-be-reset cell.

In another embodiment of the present invention, the network-side device further includes: an acquiring unit 1530, configured to acquire a MAC capability identifier, where the MAC capability identifier is configured to identify whether the user equipment has a capability of resetting at least one high speed medium access control entity.

Specific operations of units in the embodiment of the present invention include the following: The acquiring unit 1530 receives the MAC capability identifier reported by the user equipment, where the MAC capability identifier is configured to identify whether the user equipment has the capability of resetting at least one high speed medium access control entity, and the capability concurrently includes: (1) after a handover, concurrently resetting, by the user equipment, two or more high speed medium access control entities; and (2) resetting one of the high speed medium access control entities, without resetting at least one another high speed medium access control entity, so that the radio network controller may determine, according to the MAC capability identifier, whether to send the MAC control instruction to the user equipment undergoing a cell handover, thereby avoiding generation of invalid signaling.

The control instruction generating unit 1510 is configured to generate the MAC control instruction. The sending unit 1520 is configured to send the MAC control instruction to the user equipment, where the MAC control instruction is configured to instruct the user equipment to determine the to-be-reset cell according to the predefined rule, and reset the high speed medium access control entity for the to-be-reset cell.

Optionally, the MAC control instruction may be sent to the user equipment through downlink RRC signaling.

An embodiment of the present invention further provides a computer storage medium, where the computer storage medium may store a program, and when the program is executed, a part or all of the steps in the method for the method for resetting a high speed medium access control entity recorded in the preceding method embodiments are included.

Figure 16:
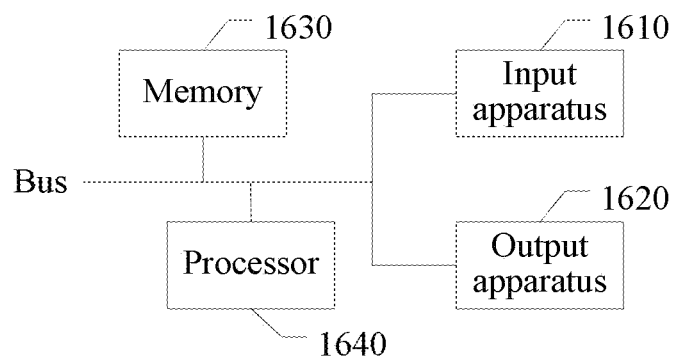
FIG. 16 is a schematic structural diagram of a computer device according to the present invention.

Referring to FIG. 16, an embodiment of the present invention further provides a user equipment, which may include:

an input apparatus 1610, an output apparatus 1620, a memory 1630, and a processor 1640 (there may be one or more processors on the user equipment, and FIG. 16 takes one processor as an example), where in some embodiments of the present invention, the input apparatus 1610, the output apparatus 1620, the memory 1630, and the processor 1640 may be connected through a bus or in another manner, and FIG. 16 takes a bus connection as an example.

The processor 1640 performs the following steps:

Report a MAC capability identifier to a radio network controller, where the MAC capability identifier is configured to identify whether the user equipment has a capability of resetting at least one high speed medium access control entity, and the capability concurrently includes: (1) after a handover, concurrently resetting, by the user equipment, two or more high speed medium access control entities; and (2) resetting one of the high speed medium access control entities, without resetting at least one another high speed medium access control entity, so that the radio network controller may determine, according to the MAC capability identifier, whether to send a reset instruction to the user equipment undergoing a cell handover, thereby avoiding generation of invalid signaling.

Receive the reset instruction sent from the radio network controller, where the reset instruction includes reset indication information of a cell.

When the cell handover (which may specifically be an HS-DSCH serving cell handover) occurs, a network-side device (for example, a base station or the radio network controller) may determine, according to information about cells before and after the cell handover, a cell that requires reset of a high speed medium access control entity, and the network-side device may use the reset indication information of the cell to indicate a to-be-reset cell in the reset instruction.

Optionally, the user equipment may receive the reset instruction through downlink RRC signaling.

Optionally, the reset indication information of the cell may be a reset indicator bit in cell configuration information or multiflow transmission configuration information, where configuration information of different cells may be distinguished according to identification information of the cells, for example, scrambling codes of the cells. For example, in cell configuration information of each cell, "1" or "TRUE" may be used to mark a cell as a to-be-reset cell, and "0" or "FALSE" may be used to mark a cell as a not-to-be-reset cell. In addition, the reset indication information of the cell may also be an identifier of a to-be-reset cell or an identifier of a not-to-be-reset cell, that is, adding cell identification information into the reset instruction to mark a to-be-reset cell or a not-to-be-reset cell; and when it is a not-to-be-reset identifier, a cell among cells that participate in HS-DSCH data transmission after the cell handover is determined except for the not-to-be-reset cell as the to-be-reset cell.

Further, the reset indication information of the cell may be carried only in cell configuration information of a non-primary cell, for example, configuration information of an assisting cell, a secondary cell, or an assisting secondary cell. When it is carried in the configuration information of these cells, the reset indication information indicates the same content as described above.

Determine the to-be-reset cell according to the reset indication information and configure a high speed medium access control entity only for the to-be-reset cell.

Referring to FIG. 16 again, an embodiment of the present invention further provides a network-side device, which may include:

an input apparatus 1610, an output apparatus 1620, a memory 1630, and a processor 1640 (there may be one or more processors on the network-side device, and FIG. 16 takes one processor as an example), where in some embodiments of the present invention, the input apparatus 1610, the output apparatus 1620, the memory 1630, and the processor 1640 may be connected through a bus or in another manner, and FIG. 16 takes a bus connection as an example.

The processor 1640 performs the following steps:

Receive a MAC capability identifier reported by a user equipment, where the MAC capability identifier is configured to identify whether the user equipment has a capability of resetting at least one high speed medium access control entity, so that the radio network controller may determine, according to the MAC capability identifier, whether to send a reset instruction to the user equipment undergoing a cell handover, thereby avoiding generation of invalid signaling.

Optionally, the user equipment may report the MAC capability identifier through uplink RRC signaling.

Determine a to-be-reset cell according to a predefined rule, where the to-be-reset cell is a cell for which the user equipment undergoing the cell handover needs to reset a high speed medium access control entity.

Optionally, the predefined rule may be as follows:

If one cell that participates in HS-DSCH data transmission after the cell handover is one of cells before the cell handover, and the user equipment is in a multiflow transmission status before or after the cell handover, the cell is a not-to-be-reset cell; or if one cell that participates in HS-DSCH data transmission after the cell handover and any cell that participates in HS-DSCH data transmission before the cell handover belong to a same base station, and the user equipment is in a multiflow status before or after the cell handover, the cell is a not-to-be-reset cell.

A cell among cells that participate in HS-DSCH data transmission after the cell handover is determined except for the not-to-be-reset cell as the to-be-reset cell.

Specifically, the Multiflow status includes: an SF-DC status, a DF-3C status, a DF-4C status, and the like. Moreover, the Multiflow status may further include: a DF-DC status (at two frequency points, two cells participate in HS-DSCH data transmission), an SF-3C status (at one frequency point, three cells participate in HS-DSCH data transmission), 3F-6C (at three frequency points, six cells participate in HS-DSCH data transmission), and 4F-8C (at four frequency points, eight cells participate in HS-DSCH data transmission).

Send the reset instruction to the user equipment, so that the user equipment resets the high speed medium access control entity for the to-be-reset cell indicated in the reset instruction. The reset instruction includes reset indication information of a cell. The reset indication information of the cell is configured to indicate a cell that requires reset of a high speed medium access control entity (to-be-reset cell for short).

Referring to FIG. 16 again, an embodiment of the present invention further provides a user equipment, which may include:

an input apparatus 1610, an output apparatus 1620, a memory 1630, and a processor 1640 (there may be one or more processors on the user equipment, and FIG. 16 takes one processor as an example), where in some embodiments of the present invention, the input apparatus 1610, the output apparatus 1620, the memory 1630, and the processor 1640 may be connected through a bus or in another manner, and FIG. 16 takes a bus connection as an example.

The processor 1640 performs the following steps:

Report a MAC capability identifier to a radio network controller, where the MAC capability identifier is configured to identify whether the user equipment has a capability of resetting at least one high speed medium access control entity, and the capability concurrently includes: (1) after a handover, concurrently resetting, by the user equipment, two or more high speed medium access control entities; and (2) resetting one of the high speed medium access control entities, without resetting at least one another high speed medium access control entity, so that the radio network controller may determine, according to the MAC capability identifier, whether to send a MAC control instruction to the user equipment undergoing a cell handover, thereby avoiding generation of invalid signaling.

Determine a to-be-reset cell according to a predefined rule. Optionally, the predefined rule may be as follows:

If one cell that participates in HS-DSCH data transmission after the cell handover is one of cells before the cell handover, and the user equipment is in a multiflow transmission status before or after the cell handover, the cell is a not-to-be-reset cell; or if one cell that participates in HS-DSCH data transmission after the cell handover and any cell that participates in HS-DSCH data transmission before the cell handover belong to a same base station, and the user equipment is in a multiflow status before or after the cell handover, the cell is a not-to-be-reset cell.

A cell among cells that participate in HS-DSCH data transmission after the cell handover is determined except for the not-to-be-reset cell as the to-be-reset cell.

Specifically, the Multiflow status includes: an SF-DC status, a DF-3C status, a DF-4C status, and the like. Moreover, the Multiflow status may further include: an SF-3C status (at a same frequency point, three cells participate in HS-DSCH data transmission), 3F-6C (at three frequency points, six cells participate in HS-DSCH data transmission), and 4F-8C (at four frequency points, eight cells participate in HS-DSCH data transmission).

Reset a high speed medium access control entity for the to-be-reset cell.

Referring to FIG. 16 again, an embodiment of the present invention further provides a network-side device, which may include:

an input apparatus 1610, an output apparatus 1620, a memory 1630, and a processor 1640 (there may be one or more processors on the network-side device, and FIG. 16 takes one processor as an example), where in some embodiments of the present invention, the input apparatus 1610, the output apparatus 1620, the memory 1630, and the processor 1640 may be connected through a bus or in another manner, and FIG. 16 takes a bus connection as an example.

The processor 1640 performs the following steps: receive a MAC capability identifier reported by a user equipment, where the MAC capability identifier is configured to identify whether the user equipment has a capability of resetting at least one high speed medium access control entity, and the capability concurrently includes: (1) after a handover, concurrently resetting, by the user equipment, two or more high speed medium access control entities; and (2) resetting one of the high speed medium access control entities, without resetting at least one another high speed medium access control entity, so that the radio network controller may determine, according to the MAC capability identifier, whether to send a MAC control instruction to the user equipment undergoing a cell handover, thereby avoiding generation of invalid signaling.

Send the MAC control instruction to the user equipment, where the MAC control instruction is configured to instruct the user equipment to determine a to-be-reset cell according to a predefined rule, and reset a high speed medium access control entity for the to-be-reset cell.

For a detailed operation procedure of the embodiment of the present invention, refer to the preceding method embodiments, and no further details are provided herein.

In the embodiments provided in the present application, it should be understood that the disclosed apparatuses and methods may be implemented through other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for resetting a high speed medium access control entity, comprising:
    receiving, by a user equipment in a multiflow transmission status, a reset instruction sent from a radio network controller when a cell handover of the user equipment takes place from a high speed downlink shared channel (HS-DSCH) serving cell to an assisting cell and/or an assisting secondary cell, wherein the reset instruction comprises: reset indication information of the assisting cell and/or the assisting secondary cell; and
    resetting, by the user equipment, the high speed medium access control entity of the assisting cell and/or the assisting secondary cell according to the reset indication information of the assisting cell and/or the assisting secondary cell;
    wherein when the user equipment is in the multiflow transmission status, multiflow cells corresponding to the multiflow transmission status are configured to the user equipment,
    the multiflow cells have a same frequency and include the HS-DSCH serving cell, the assisting cell, a secondary serving cell and the assisting secondary cell,
    the assisting cell has an intra-frequency with the HS-DSCH serving cell,
    the secondary serving cell has a same timing relationship as the HS-DSCH serving cell, and
    the assisting secondary cell has an intra-frequency with the secondary serving cell.

2. The method according to claim 1, wherein the reset indication information of the assisting cell and/or the assisting secondary cell comprises:
    a reset indicator bit in cell configuration information.

3. The method according to claim 2, wherein the resetting the high speed medium access control entity for the assisting cell and/or the assisting secondary cell according to the reset indication information of the assisting cell and/or the assisting secondary cell comprises:

resetting, by the user equipment, the high speed medium access control entity for the assisting cell and/or the assisting secondary cell if a value of the reset indicator bit is "TRUE".

4. The method according to claim 1, wherein the reset instruction is transmitted by radio resource control (RRC) protocol signaling.

5. A method for resetting a high speed medium access control entity, comprising:
  determining a to-be-reset cell in an assisting cell and/or an assisting secondary cell according to a predefined rule when a user equipment is in a multiflow transmission status and a cell handover of the user equipment takes place from a high speed downlink shared channel (HS-DSCH) serving cell to the assisting cell and/or the assisting secondary cell, wherein the to-be-reset cell is a cell for which the user equipment undergoing the cell handover needs to reset the high speed medium access control entity; and
  sending a reset instruction to the user equipment, so that the user equipment resets the high speed medium access control entity of the to-be-reset cell indicated in the reset instruction, wherein the reset instruction comprises: reset indication information of the assisting cell and/or the assisting secondary cell;
  wherein when the user equipment is in the multiflow transmission status, multiflow cells corresponding to the multiflow transmission status are configured to the user equipment,
    the multiflow cells have a same frequency and include the HS-DSCH serving cell, the assisting cell, a secondary serving cell and the assisting secondary cell,
    the assisting cell has an intra-frequency with the HS-DSCH serving cell,
    the secondary serving cell has a same timing relationship as the HS-DSCH serving cell, and
    the assisting secondary cell has an intra-frequency with the secondary serving cell.

6. The method according to claim 5, wherein the determining the to-be-reset cell in the assisting cell and/or the assisting secondary cell according to the predefined rule comprises:
  if after the cell handover of the user equipment takes place, an assisting cell and/or an assisting secondary cell that participates in HS-DSCH data transmission is one of the multiflow cells before the cell handover of the user equipment takes place, and the user equipment is before or after the cell handover, determining that the assisting cell and/or the assisting secondary cell is a not-to-be-reset cell; or
  if one assisting cell and/or one assisting secondary cell that participates in HS-DSCH data transmission after the cell handover and any one assisting cell and/or any one assisting secondary cell that participates in HS-DSCH data transmission before the cell handover belongs to a same base station, and the user equipment is in the multiflow transmission status before or after the cell handover, determining that the assisting cell and/or the assisting secondary cell is a not-to-be-reset cell; and
  determining that an assisting cell and/or an assisting secondary cell other than the not-to-be-reset cell among assisting cells and/or assisting secondary cells that participate in HS-DSCH data transmission after the cell handover is the to-be-reset cell.

7. The method according to claim 5, wherein the reset instruction is transmitted by radio resource control (RRC) signaling.

8. The method according to claim 5, wherein the reset indication information of the assisting cell and/or the assisting secondary cell comprises:
  a reset indicator bit in cell configuration information.

9. A method for resetting a high speed medium access control entity, comprising:
  receiving, by a user equipment in a multiflow transmission status, a medium access control (MAC) control instruction sent from a radio network controller, wherein the MAC control instruction is configured to instruct the user equipment to determine a to-be-reset cell from an assisting cell and/or an assisting secondary cell when a cell handover of the user equipment takes place from a high speed downlink shared channel (HS-DSCH) serving cell to the assisting cell and/or the assisting secondary cell;
  determining, by the user equipment, the to-be-reset cell from the assisting cell and/or the assisting secondary cell according to a predefined rule; and
  resetting, by the user equipment, the high speed medium access control entity for the to-be-reset cell;
  wherein when the user equipment is in the multiflow transmission status, multiflow cells corresponding to the multiflow transmission status are configured to the user equipment,
    the multiflow cells have a same frequency and include the HS-DSCH serving cell, the assisting cell, a secondary serving cell and the assisting secondary cell,
    the assisting cell has an intra-frequency with the HS-DSCH serving cell,
    the secondary serving cell has a same timing relationship as the HS-DSCH serving cell, and
    the assisting secondary cell has an intra-frequency with the secondary serving cell.

10. The method according to claim 9, wherein the determining the to-be-reset cell from the assisting cell and/or the assisting secondary cell according to the predefined rule comprises:
  if after the cell handover of the user equipment takes place, a third assisting cell and/or a third assisting secondary cell that participates in high speed downlink shared channel (HS-DSCH) data transmission is one of the multiflow cells before the cell handover of the user equipment takes place, and the user equipment is before or after the cell handover, determining that the third assisting cell and/or the third assisting secondary cell is a not-to-be-reset cell; or if a fourth assisting cell and/or a fourth assisting secondary cell that participates in HS-DSCH data transmission after the cell handover and any one assisting cell and/or any one assisting secondary cell that participates in HS-DSCH data transmission before the cell handover belongs to a same base station, and the user equipment is before or after the cell handover, determining that the fourth assisting cell and/or the fourth assisting secondary cell is a not-to-be-reset cell; and
  determining that other assisting cell and/or other assisting secondary cell among assisting cells and/or assisting secondary cells that participate in HS-DSCH data transmission after the cell handover except for the not-to-be-reset cell is the to-be-reset cell.

11. The method according to claim 9, wherein the MAC control instruction is transmitted by radio resource control (RRC) signaling.

12. A method for resetting a high speed medium access control entity, comprising:
sending a medium access control (MAC) control instruction to a user equipment when the user equipment is in a multiflow transmission status and a cell handover of the user equipment takes place from a high speed downlink shared channel (HS-DSCH) serving cell to an assisting cell and/or an assisting secondary cell, wherein the MAC control instruction is configured to instruct the user equipment to determine a to-be-reset cell from the assisting cell and/or the assisting secondary cell according to a predefined rule; and reset the high speed medium access control entity for the to-be-reset cell;
wherein when the user equipment is in the multiflow transmission status, multiflow cells corresponding to the multiflow transmission status are configured to the user equipment,
the multiflow cells have a same frequency and include the HS-DSCH serving cell, the assisting cell, a secondary serving cell and the assisting secondary cell,
the assisting cell has an intra-frequency with the HS-DSCH serving cell,
the secondary serving cell has a same timing relationship as the HS-DSCH serving cell, and
the assisting secondary cell has an intra-frequency with the secondary serving cell.

13. The method according to claim 12, wherein the MAC control instruction is transmitted by radio resource control (RRC) signaling.

14. A user equipment, comprising:
a receiver, configured to receive a reset instruction sent from a radio network controller when the user equipment is in a multiflow transmission status and a cell handover of the user equipment takes place from a high speed downlink shared channel (HS-DSCH) serving cell to an assisting cell and/or an assisting secondary cell, wherein the reset instruction comprises: reset indication information of the assisting cell and/or the assisting secondary cell; and
a processor, configured to reset the high speed medium access control entity for the assisting cell and/or the assisting secondary cell according to the reset indication information of the assisting cell and/or the assisting secondary cell;
wherein when the user equipment is in the multiflow transmission status, multiflow cells corresponding to the multiflow transmission status are configured to the user equipment,
the multiflow cells have a same frequency and include the HS-DSCH serving cell, the assisting cell, a secondary serving cell and the assisting secondary cell,
the assisting cell has an intra-frequency with the HS-DSCH serving cell,
the secondary serving cell has a same timing relationship as the HS-DSCH serving cell, and
the assisting secondary cell has an intra-frequency with the secondary serving cell.

15. The user equipment according to claim 14, wherein the processor is further configured to reset the high speed medium access control entity for the assisting cell and/or the assisting secondary cell if a value of a reset indicator bit of the reset indication information of the assisting cell and/or the assisting secondary cell is "TRUE".

16. A network-side device, comprising:
a processor, configured to determine a to-be-reset cell from an assisting cell and/or an assisting secondary cell according to a predefined rule when a user equipment is in a multiflow transmission status and a cell handover of the user equipment takes place from a high speed downlink shared channel (HS-DSCH) serving cell to the assisting cell and/or the assisting secondary cell, wherein the to-be-reset cell is a cell for which the user equipment undergoing the cell handover needs to reset a high speed medium access control entity; and
a transmitter, configured to send a reset instruction to the user equipment, so that the user equipment resets the high speed medium access control entity for the to-be-reset cell indicated in the reset instruction, wherein the reset instruction comprises: reset indication information of the assisting cell and/or the assisting secondary cell;
wherein when the user equipment is in the multiflow transmission status, multiflow cells corresponding to the multiflow transmission status are configured to the user equipment,
the multiflow cells have a same frequency and include the HS-DSCH serving cell, the assisting cell, a secondary serving cell and the assisting secondary cell,
the assisting cell has an intra-frequency with the HS-DSCH serving cell,
the secondary serving cell has a same timing relationship as the HS-DSCH serving cell, and
the assisting secondary cell has an intra-frequency with the secondary serving cell.

17. The network-side device according to claim 16, wherein the processor is further configured to: if after the cell handover of the user equipment takes place, one assisting cell and/or one assisting secondary cell that participates in high speed downlink shared channel (HS-DSCH) data transmission is one of the multiflow cells before the cell handover of the user equipment takes place, and the user equipment is in after the cell handover, determine that the assisting cell and/or the assisting secondary cell is a not-to-be-reset cell; or if one assisting cell and/or one assisting secondary cell that participates in HS-DSCH data transmission after the cell handover and any one assisting cell and/or any one assisting secondary cell that participates in HS-DSCH data transmission before the cell handover belongs to a same base station, and the user equipment is in before or after the cell handover, determine that the assisting cell and/or the assisting secondary cell is a not-to-be-reset cell; and
wherein the processor is further configured to determine an assisting cell and/or an assisting secondary cell among assisting cells and/or assisting secondary cells that participate in HS-DSCH data transmission after the cell handover except for the not-to-be-reset cell as the to-be-reset cell.

18. A user equipment, comprising:
a receiver, configured to receive a medium access control (MAC) control instruction sent from a radio network controller when the user equipment is in a multiflow transmission status and a cell handover of the user equipment takes place from a high speed downlink shared channel (HS-DSCH) serving cell to an assisting cell and/or an assisting secondary cell, wherein the MAC control instruction is configured to instruct the user equipment to determine a to-be-reset cell from the assisting cell and/or the assisting secondary cell; and a processor, configured to determine the to-be-reset cell from the assisting cell and/or the assisting secondary cell according to a predefined rule and reset a high speed medium access control entity for the to-be-reset cell;

wherein when the user equipment is in the multiflow transmission status, multiflow cells corresponding to the multiflow transmission status are configured to the user equipment, the multiflow cells have a same frequency and include the HS-DSCH serving cell, the assisting cell, a secondary serving cell and the assisting secondary cell, the assisting cell has an intra-frequency with the HS-DSCH serving cell, the secondary serving cell has a same timing relationship as the HS-DSCH serving cell, and the assisting secondary cell has an intra-frequency with the secondary serving cell.

19. The user equipment according to claim 18, wherein the processor is further configured to: if after the cell handover of the user equipment takes place, one assisting cell and/or one assisting secondary cell that participates in high speed downlink shared channel (HS-DSCH) data transmission is one of the multiflow cells before the cell handover of the user equipment takes place, and the user equipment is in before or after the cell handover, determine that the assisting cell and/or the assisting secondary cell is a not-to-be-reset cell; or if one assisting cell and/or one assisting secondary cell that participates in HS-DSCH data transmission after the cell handover and any one assisting cell and/or any one assisting secondary cell that participates in HS-DSCH data transmission before the cell handover belongs to a same base station, and the user equipment is in before or after the cell handover, determine that the assisting cell and/or the assisting secondary cell is a not-to-be-reset cell; and wherein the processor is further configured to determine that an assisting cell and/or an assisting secondary cell among assisting cells and/or assisting secondary cells that participate in HS-DSCH data transmission after the cell handover except for the not-to-be-reset cell is the to-be-reset cell.

20. A network-side device, comprising:

a processor, configured to generate a medium access control (MAC) control instruction; and a transmitter, configured to send the MAC control instruction to a user equipment when the user equipment is in a multiflow transmission status and a cell handover of the user equipment takes place from a high speed downlink shared channel (HS-DSCH) serving cell to an assisting cell and/or an assisting secondary cell, wherein the MAC control instruction is configured to instruct the user equipment to determine a to-be-reset cell from the assisting cell and/or the assisting secondary cell according to a predefined rule, and reset a high speed medium access control entity for the to-be-reset cell;

wherein when the user equipment is in the multiflow transmission status, multiflow cells corresponding to the multiflow transmission status are configured to the user equipment, the multiflow cells have a same frequency and include the HS-DSCH serving cell, the assisting cell, a secondary serving cell and the assisting secondary cell, the assisting cell has an intra-frequency with the HS-DSCH serving cell, the secondary serving cell has a same timing relationship as the HS-DSCH serving cell, and the assisting secondary cell has an intra-frequency with the secondary serving cell.

* * * * *